United States Patent
DeLuca et al.

(10) Patent No.: US 11,163,735 B2
(45) Date of Patent: *Nov. 2, 2021

(54) DATABASE CAPACITY ESTIMATION FOR DATABASE SIZING

(71) Applicant: International Business Machines Corporation, Armonk, NY (US)

(72) Inventors: Lisa Seacat DeLuca, Baltimore, MD (US); Dana L. Price, Cary, NC (US); Joan C. Ruta, Piscataway, NJ (US); Shelbee D. Smith-Eigenbrode, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 294 days.

This patent is subject to a terminal disclaimer.

(21) Appl. No.: 16/446,967

(22) Filed: Jun. 20, 2019

(65) Prior Publication Data
US 2019/0303356 A1 Oct. 3, 2019

Related U.S. Application Data

(63) Continuation of application No. 14/243,948, filed on Apr. 3, 2014, now Pat. No. 10,394,772.

(51) Int. Cl.
*G06F 16/00* (2019.01)
*G06F 16/21* (2019.01)
(Continued)

(52) U.S. Cl.
CPC ...... *G06F 16/217* (2019.01); *G06F 16/24578* (2019.01)

(58) Field of Classification Search
None
See application file for complete search history.

(56) References Cited

U.S. PATENT DOCUMENTS 6,003,022 A * 12/1999 Eberhard ............... G06F 11/34
6,816,904 B1 11/2004 Ludwig et al.
(Continued)

OTHER PUBLICATIONS

Restriction (dated Sep. 1, 2016) for U.S. Appl. No. 14/243,948, filed Apr. 3, 2014.
(Continued)

*Primary Examiner* — Tuankhanh D Phan
(74) *Attorney, Agent, or Firm* — Schmeiser, Olsen & Watts, LLP; William Hartwell (57) ABSTRACT

A method and system for sizing databases. Multiple patterns of historical capacity usage by multiple databases in a computer system are identified. The multiple patterns are statistically significant for multiple characteristics due to the multiple databases including an input value of each characteristic of multiple characteristics pertaining to utilization of the multiple databases. A weighted value of capacity usage is computed as ACP*FC*PC, wherein ACP=an average value of historical capacity points for each pattern, FC=fraction of the characteristics associated with each pattern, and PC=a fraction of the multiple databases used for each pattern. One or more current databases are sized via utilization of the computed total value of capacity usage. A virtual machine or a new server of the computer system is created. The virtual machine or new server includes the sized one or more current databases.

18 Claims, 5 Drawing Sheets

(51) Int. Cl.
*G06F 16/2457* (2019.01)
*G06F 8/00* (2018.01)

(56) References Cited

U.S. PATENT DOCUMENTS

| | | | |
|---|---|---|---|
| 6,963,828 | B1 | 11/2005 | McDonald et al. |
| 7,047,177 | B1 | 5/2006 | Lee et al. |
| 7,062,426 | B1 | 6/2006 | McDonald et al. |
| 8,028,044 | B1 | 9/2011 | Ramany et al. |
| 8,812,646 | B1 | 8/2014 | Zhang et al. |
| 10,394,772 | B2 * | 8/2019 | DeLuca ............ G06F 16/24578 |
| 2003/0023963 | A1 * | 1/2003 | Birkholz ................... G06F 8/65 717/172 |
| 2006/0074970 | A1 | 4/2006 | Narayanan et al. |
| 2015/0286661 | A1 | 10/2015 | DeLuca et al. |

OTHER PUBLICATIONS

Response to Restriction with preliminary amendment (dated Oct. 31, 2016) for U.S. Appl. No. 14/243,948, filed Apr. 3, 2014.
Office Action (dated Dec. 1, 2016) for U.S. Appl. No. 14/243,948, filed Apr. 3, 2014.
Amendment (dated Feb. 22, 2017) for U.S. Appl. No. 14/243,948, filed Apr. 3, 2014.
Final Office Action (dated Jun. 15, 2017) for U.S. Appl. No. 14/243,948, filed Apr. 3, 2014.
Final amendment (dated Aug. 1, 2017) for U.S. Appl. No. 14/243,948, filed Apr. 3, 2014.
Advisory Action (dated Aug. 28, 2017) for U.S. Appl. No. 14/243,948, filed Apr. 3, 2014.
Notice of Appeal (Sep. 14, 2017) for U.S. Appl. No. 14/243,948, filed Apr. 3, 2014.
Appeal Brief (Nov. 13, 2017) for U.S. Appl. No. 14/243,948, filed Apr. 3, 2014.
Office Action (dated Apr. 17, 2018) for U.S. Appl. No. 14/243,948, filed Apr. 3, 2014.
Amendment (dated Jul. 12, 2018) for U.S. Appl. No. 14/243,948, filed Apr. 3, 2014.
Final Office Action (dated Nov. 19, 2018) for U.S. Appl. No. 14/243,948, filed Apr. 3, 2014.
Final amendment (dated Jan. 22, 2019) for U.S. Appl. No. 14/243,948, filed Apr. 3, 2014.
Advisory Action (dated Feb. 25, 2019) for U.S. Appl. No. 14/243,948, filed Apr. 3, 2014.
RCE (Feb. 25, 2019) for U.S. Appl. No. 14/243,948, filed Apr. 3, 2014.
Notice of Allowance (dated Apr. 12, 2019) for U.S. Appl. No. 14/243,948, filed Apr. 3, 2014.

* cited by examiner

FIG. 5

DATABASE CAPACITY ESTIMATION FOR DATABASE SIZING

This application is a continuation application claiming priority to Ser. No. 14/243,948, filed Apr. 3, 2014, now U.S. Pat. No. 10,394,772 issued Aug. 27, 2019.

TECHNICAL FIELD

The present invention relates generally to database sizing, and more specifically to estimation of requisite database capacity usage.

BACKGROUND

When a new database is required, it can be difficult to predict the amount of memory and processors needed to provide the required performance for its intended application. It can also be difficult to correlate changes to structure and use with their impact on performance. It was known to estimate a requisite amount of memory and processor for a new database based on a comparison to memory and processor in existing databases and the resultant performance. It was also known to adjust the amount of memory and processor for a database over time, based on the measured performance during actual use. However, it is helpful to make a good estimate of the requisite amounts of memory and processor when initially designing a database to provide good performance without the expense of excess memory or processors or the need to upgrade soon afterwards.

McDonald et el. (U.S. Pat. No. 7,062,426) disclose a sizing tool which correlates each operating system to each user type which is correlated to each application and increased by the number of particular user types and the number of applications involved in order to establish the total memory requirements.

McDonald et el. (U.S. Pat. No. 6,963,828) disclose a sizing tool which allocates the optimum number of users to each server farm while also providing an optimized configuration of server farms having a desired availability level and suitable redundancy to fulfill the requirements and needs in a customer's enterprise.

Lee et el. (U.S. Pat. No. 7,047,177) disclose a sizing tool for providing the most suitable configuration for each specialized enterprise of a customer.

Eberhard, et al. (U.S. Pat. No. 6,003,022) estimates the cost of execution related to specific database transactions, including predicting the cost of execution via individual database transactions.

BRIEF SUMMARY

The present invention provides a method and an associated system for sizing databases. One or more processors receive an input value of each characteristic of multiple characteristics pertaining to utilization of multiple databases in a computer system. The one or more processors identify multiple patterns of historical capacity usage by the multiple databases, wherein the multiple patterns are statistically significant for the multiple characteristics and encompass the input values, and wherein the capacity usage is memory usage or central processing unit (CPU) usage. The one or more processors compute, for each pattern, a weighted value of capacity usage as an average value of historical capacity usage for each pattern weighted by a function of a fraction of the multiple databases used for each pattern. The one or more processors compute a total value of capacity usage as a sum of the weighted values of capacity usage. The one or more processors perform sizing one or more current databases, wherein the sizing utilizes the computed total value of capacity usage. The database sizing may be based on query complexity in dependence on rates of occurrence of queries to the historic databases and to the current database.

DETAILED DESCRIPTION

Figure 1:
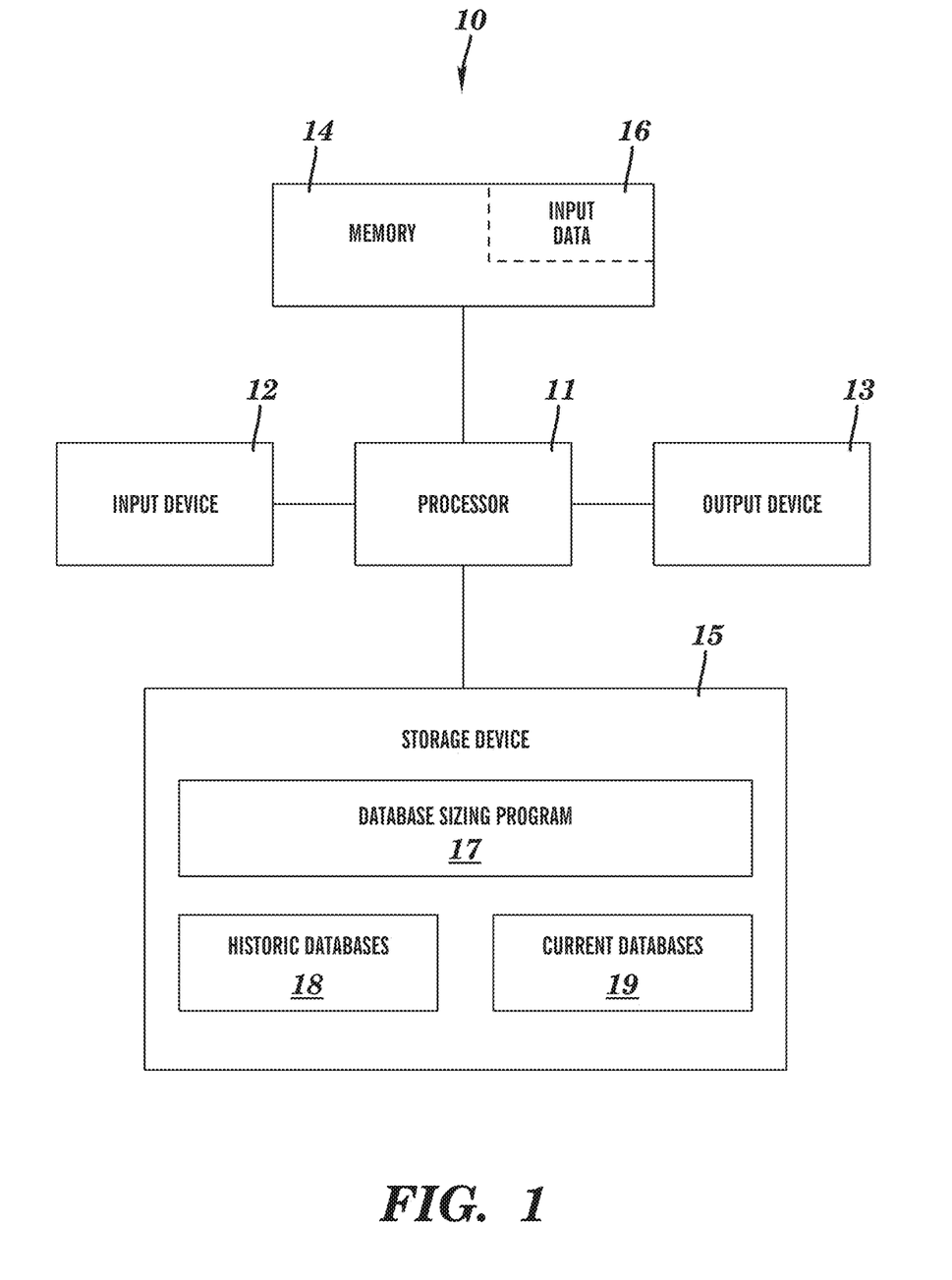
FIG. 1 illustrates a computer system for sizing databases, in accordance with embodiments of the present invention.

FIG. 1 illustrates a computer system 10 for sizing databases, in accordance with embodiments of the present invention. The computer system 10 comprises a processor 11, an input device 12 coupled to the processor 11, an output device 13 coupled to the processor 11, a memory 14 coupled to the processor 11, and a storage device 15 each coupled to the processor 11. The input device 12 may be, inter alia, a keyboard, a mouse, etc. The output device 13 may be, inter alia, a printer, a plotter, a computer screen, a magnetic tape, a removable hard disk, a floppy disk, etc. The memory 14 may be, inter alia, random access memory (RAM). The storage device 15 may be, inter alia, a hard disk, a floppy disk, a magnetic tape, an optical storage such as a compact disc (CD) or a digital video disc (DVD), etc. The storage device 15 stores computer programs, including database sizing program 17, configured to be executed by the processor 11 via the memory 14 to manage capacity usage by databases. The storage device 15 also includes historic databases 18 and current databases 19. The storage device 15 also includes historic databases 18 and current databases 19.

The database sizing program 17 includes program instructions that utilize data in the historic databases 18 to size the current databases 19. The current databases 19 are defined as either new databases that have not been previously sized or existing databases that were previously sized and are currently being resized. The historic databases 18 are defined as previously used databases whose historical data is being used to size or resize the current databases 19.

The processor 11 executes the database sizing program 17. The memory 14 may store input data 16 required by the program 17. The output device 13 displays output from the programs 17. The storage device 15 is a computer readable storage device (such as a magnetic disk or semiconductor memory), or alternatively a plurality of tangible computer readable storage devices, storing the programs 17 for execution by the processor 11, or alternatively by one or more processors (e.g., a plurality of processors), via the memory 14. Generally, the program 17 may be stored on a single storage device or may be stored by being distributed among a plurality of storage devices in any manner known in the art. A computer program product (or, alternatively, an article of manufacture) of the computer system 10 may comprise the storage device 15, or a plurality of storage devices, storing the program 17 for execution by the processor 11, or alternatively by a plurality of processors, via the memory 14. The term "computer readable storage device" does not mean a signal propagation medium such as a copper transmission cable, an optical transmission fiber, or a wireless transmission media.

While FIG. 1 shows the computer system 10 as a particular configuration of hardware and software, any configuration of hardware and software, as would be known to a person of ordinary skill in the art, may be utilized for the purposes stated supra in conjunction with the particular computer system 10 of FIG. 1.

The present invention includes a sizing engine, namely the database sizing program 17. The sizing engine uses historical capacity data in the historic databases 18 for patterns of capacity usage by databases with similar characteristics to estimate a sizing of capacity for a new or changed database, such as a database in a Relational Database Management System (RDBMS). In one embodiment, the capacity that is sized is memory capacity or central processing unit (CPU) capacity. The estimate of capacity sizing by the sizing engine can be fed into a provisioning system (e.g., a cloud based technology system) to create a virtual machine or a new server.

This description of the present invention expresses capacity in terms of capacity points which can be translated, via a conversion factor, to capacity units for specific hardware such as units of megabytes, gigabytes, etc. for memory capacity, or units of megahertz, gigahertz, etc. for CPU capacity, or a relative performance metric (e.g., rPerf).

The historical capacity data of the historic databases 18 is stored in a data repository and includes enough data to be statistically relevant. Thus, the historical capacity data includes an adequate sample of production database usage data collected over a period of time.

The sizing engine includes sub-processes pertaining to sizing calculations, data analytics, and change triggers.

Figure 2:
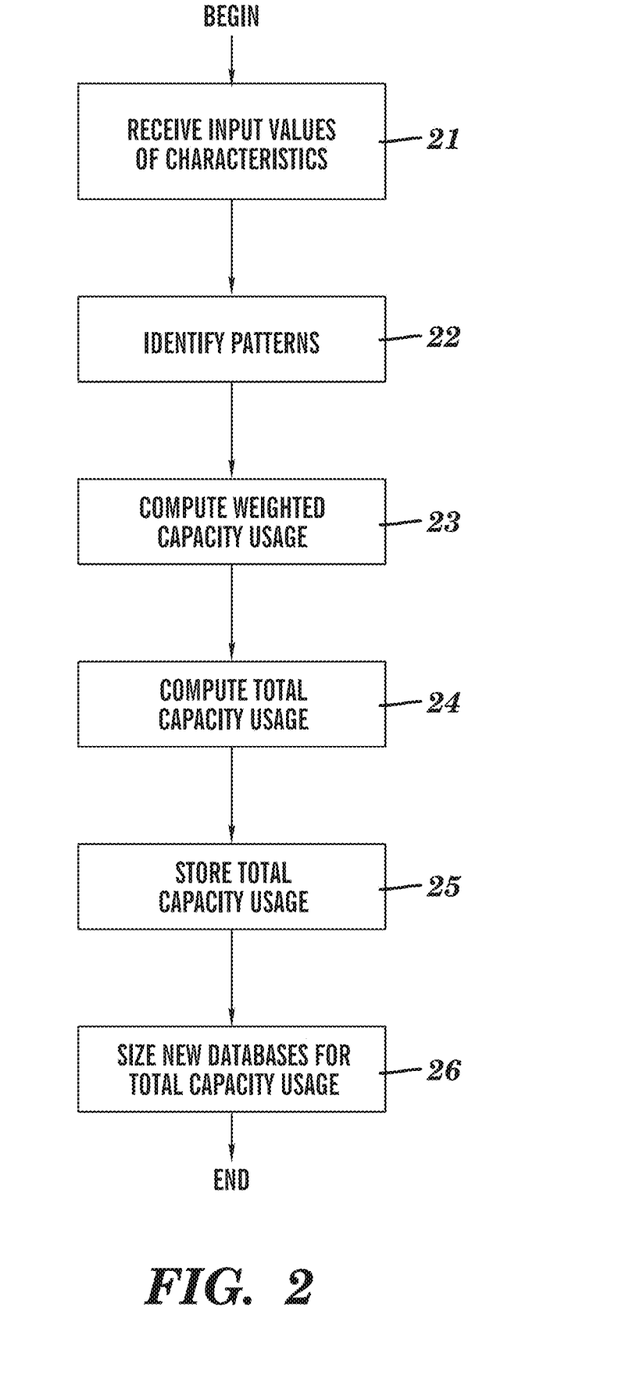
FIG. 2 is a flow chart of a method for sizing databases, in accordance with embodiments of the present invention.

The sizing calculations produce capacity sizing estimates based on system input received and weighted capacity values, as discussed infra in conjunction with FIG. 2.

Figure 3:
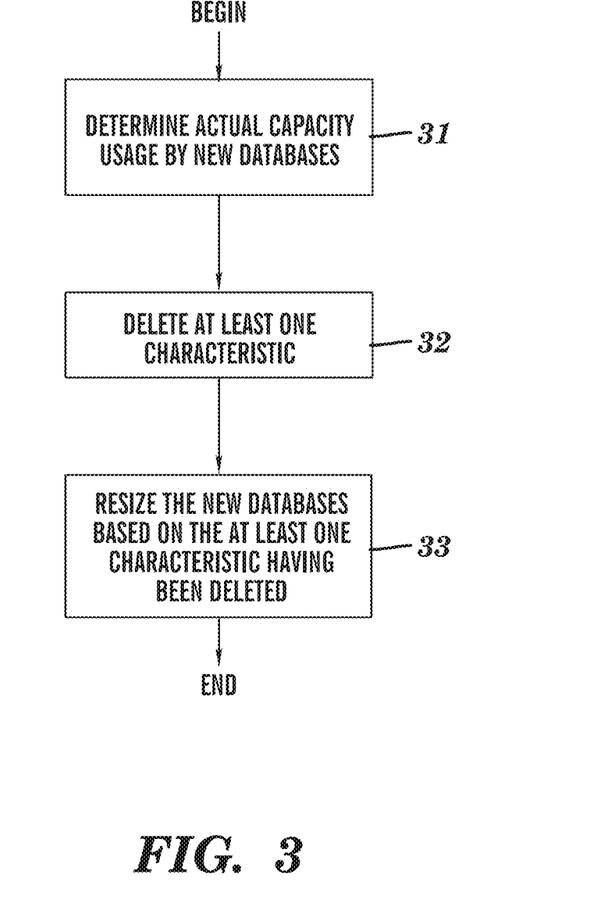
FIG. 3 is a flow chart describing deletion of at least one characteristic previously used to size current databases via the method of FIG. 2, and resizing the current databases in consideration of the deleted at least one characteristic, in accordance with embodiments of the present invention.

The data analytics include adding, deleting, and/or modifying weighted values assigned to pre-defined database characteristics, as discussed infra in conjunction with FIG. 3. Characteristics are weighted by analyzing patterns and relationships between the characteristic and usage. The data analytics also include a methodology for completely adding or removing a defined database characteristic.

The change triggers include triggers to change weighted capacity values, which enables continuous refinement of the sizing engine to increase the accuracy of the capacity estimates.

The present invention includes a set of characteristics pertaining to utilization of the historic databases 18. The list of characteristics can change as new characteristics are identified or as old characteristics are no longer showing statistically relevant relationships to capacity. This relevance is based on the analytics found in the change triggers sub-process. The following list shows typical characteristics that may be applied to the sizing engine input:

1. RDBMS: Type of RDBMS (Ex. DB2, Oracle)
2. Version: Version of RDBMS (Specific versions may have greater capacity requirements)
3. Database Size: Size of Database
4. Query Complexity. The rate of database queries impacts memory and processor requirements of the database, such that a greater rate of database queries requires more memory and processor to meet a performance requirement. However, the more complex the database queries the greater the requirement of memory and processors, and vice versa. Therefore, in estimating the requisite amount of memory and processor for a database, the database sizing program 17 considers not only the rate of database queries, but also the complexity of the database queries.
    a. % of Low complexity/highly tuned queries (such as simple select/update/insert/delete on indexed tables)
    b. % of Medium complexity/tuned queries (such as two-way joins, two-way sub-queries, simple DML/DDL)
    c. % of High complexity/tuned queries (such as multiple joins, un-indexed scans, aggregated joins, multiple sub-queries)
5. Bufferpool Size(s)
6. Database Type: Type of database (Ex. OLAP, Data Warehouse)
7. Total number of database users
8. Total number of database users during peak time
9. Average number of database users
10. Average number of transactions per hour
11. Maximum number of transactions per hour The preceding characteristics are exemplary and the scope of the present invention is not limited to the preceding characteristic and may include any other characteristics that are statistically relevant for calculating or estimating capacity.

FIG. 2 is a flow chart of a method for sizing databases, in accordance with embodiments of the present invention. The flow chart of FIG. 2 includes steps 21-26.

In step 21, the database sizing program 17 receives a system input value of each characteristic of multiple characteristics pertaining to utilization of multiple databases in the computer system 10. In one embodiment, the multiple databases comprise the historic databases 18.

In one embodiment, the multiple characteristics comprise complexity of database queries including multiple joins.

In step 22, the database sizing program 17 identifies multiple patterns of historical capacity usage by the multiple databases. The multiple patterns are statistically significant for the multiple characteristics and encompass the input values.

Each pattern is statistically significant for either only a single characteristic (individual pattern) or for two or more characteristics (relationship pattern). Each pattern encompasses the input value of each characteristic for which each pattern is statistically significant.

The relative importance of each characteristic in a relationship pattern is not accounted for explicitly, since the characteristics in a relationship pattern are effectively combined.

In one embodiment, the capacity usage is memory usage or central processing unit (CPU) usage.

Each pattern may be statistically significant due to a first percent of the multiple databases having the input value, or being within a predetermined range of values that include the input value, for the single characteristic or for the two or more characteristics, subject to the first percent being at least a predetermined percent.

In step 23, the database sizing program 17 computes, for each pattern, a weighted value of capacity usage (WCU) as a function of ACP, FC, and FD, wherein:

ACP=average number of capacity points for each pattern, which is a value or measure of historical capacity usage for each pattern;

FC=fraction of the characteristics associated with the pattern; and

FD=fraction of databases used for the pattern.

In one embodiment, WCU=ACP*FC*FD, reflecting a linear dependence of WCU on FD for weighting the average number of capacity points (ACP).

In one embodiment, WCU depends nonlinearly on FD. For example WCU may be proportional to $(FD)^P$ wherein P=0.5, 2, 3, any positive real number exceeding 1, etc. As another example, WCU may be proportional to exp(A*(FD)) wherein A is a positive or negative real number.

In step 24, the database sizing program 17 computes a total value of capacity usage (TCU) as a sum of the weighted values (WCU) of capacity usage.

In step 25, the database sizing program 17 stores the computed total value of capacity usage in a computer readable memory device of the computer system 10.

In step 26, the database sizing program 17 sizes at least one current database. The sizing utilizes the computed total value of capacity usage. The databases which are sized in step 26 are one or more current databases. In one embodiment, the sizing of each database in the computer system requires the computer system to make available at least 100% of the computed total value of capacity usage (TCU) to each database (e.g., 100%, 110%, 120%, 125%, 1300/%, 150%, etc.).

FIG. 3 is a flow chart describing deletion of at least one characteristic previously used to size current databases via the method of FIG. 2, and resizing the current databases in consideration of the deleted at least one characteristic, in accordance with embodiments of the present invention. The flow chart of FIG. 3 includes steps 31-33.

In step 31, the database sizing program 17 determines that an actual capacity usage by the current databases over a period of time after the current databases were sized is not within a predetermined percentage of the computed total value of capacity usage, and in response, identifying at least one characteristic of the multiple characteristics for which an attempt to identify a statistically significant pattern was unsuccessful.

For example, step 31 may attempt to determine whether 85% of the total number of databases are within ±20% of the original capacity estimate, e.g., for 100 databases, the issue is whether at least 85 of the 100 databases have actual memory usage within 20% N of the original capacity estimate of 1695 (i.e., between 1695-339 and 1695+339). The original estimate of 1695 is the initially sized capacity estimate in EXAMPLE 1 discussed infra.

The actual capacity usage may be a time-averaged capacity usage or an average peak capacity usage periodically (e.g., daily, weekly, etc.) within the period of time (e.g., a week, a month, three months, six months, a year, etc.).

In step 32, the database sizing program 17 deletes the identified at least one characteristic from the multiple characteristics.

In step 33, the database sizing program 17 resizes the current databases based on the at least one characteristic having been deleted from the multiple characteristics. The resizing of the current databases may employ the method of sizing databases described in FIG. 2.

In addition to deleting at least one characteristic in accordance with the process of FIG. 3, the present invention may add characteristics that are statistically relevant and resize databases based on the added characteristics using the method of sizing databases described in FIG. 2.

Although the present invention is specific to sizing a database, the same method/process can be used to size other middleware/technologies by creating a series of repositories with usage data and determining patterns impacting capacity.

Example 1. Sizing Databases: Individual Patterns for Sizing CPU Capacity

A total number of characteristics (TC) is two characteristics, namely database size and query complexity.

For the first characteristic of database size, a system input value of 1.2 terabytes is received. An individual pattern Pattern_DS_1 is identified and encompasses the input value of 1.2 terabytes. The fraction of the characteristics (FC) associated with the pattern Pattern_DS_1 is 0.50 (i.e., one out of two characteristics). For the pattern Pattern_DS_1, the fraction of databases used for the pattern (FD) is 0.95 and the average number of capacity points historically used by the pattern (ACP) is 1800; i.e., 95% of databases over 1 terabyte use between 1700 and 1900 capacity points. For this example, the weighted value of capacity usage for the first characteristic (WCU1) is equal to ACP*FC*FD which is numerically equal to 855; i.e., (1800*0.50*0.95).

For the characteristic of query complexity, a system input value of 0.70 is received. An individual pattern Pattern_QC_1 is identified and encompasses the input value of 0.70 (i.e., 70% of transactions run complex queries). The fraction of the characteristics (FC) associated with the pattern Pattern_QC_1 is 0.50 (i.e., one out of two characteristics). For the pattern Pattern_QC_1, the fraction of databases used for the pattern (FD) is 0.80 and the average number of capacity points historically used by this pattern (ACP) is 2100; i.e., 80% of databases having 70% transactions running complex queries use between 2000 and 2200 capacity points. For this example, the weighted value of capacity usage for the second characteristic (WCU2) is equal to ACP*FC*FD which is numerically equal to 840; i.e., (2100*0.50*0.80).

The total CPU capacity sizing estimate is a sum of the weighted values of capacity usage, namely WCU1+WCU2, which is numerically equal to 1695 (i.e., 855+840).

Example 2. Sizing Databases: Relationship Pattern for Sizing CPU Capacity

A total number of characteristics (TC) is the same two characteristics of EXAMPLE 1, namely database size and query complexity. In this example, the two characteristics are analyzed collectively in a relationship pattern PatternDS_QC_1 characterized by 98% of databases fitting both Pattern_DS_1 and Pattern_QC_1 of EXAMPLE 1 use 1900-2100 capacity points. Thus, for the pattern of Pattern_DS_QC_1, ACP=2000, FC=1.0 (i.e., the fraction of the characteristics associated with the pattern is 1.0, because 100% of the total number of characteristics is associated with the relationship pattern Pattern_DS_QC_1), and FD=0.98, so that the weighted value of capacity usage (WCU) is equal to ACP*FC*FD which is numerically equal to 1960; i.e., (2000*1.0*0.98).

Example 3. Sizing Databases: Multiple Relationship Patterns for Sizing CPU Capacity A total number of seven characteristics (TC) are as follows with their indicated system input values in parenthesis:

RDBMS (DB2_ESE);
PLATFORM (pSeries/AIX);
DATABASE_SIZE (500 GB);
BUFFERPOOL_SIZE (700 GB);
%_HIGH_COMPLEX_QUERIES (50);
%_MEDIUM_COMPLEX_QUERIES (40);
%_LOW_COMPLEX_QUERIES (10).

The seven characteristics are grouped into three relationship patterns as follows with the characteristics in parenthesis for each relationship pattern:

Relationship pattern: Pattern_DBM_1 (RDBMS, PLATFORM);
Relationship pattern: Pattern_DB_BP_5 (DATABASE_SIZE, BUFFERPOOL_SIZE);
Relationship pattern: Pattern_QY_MIX_12 (% HIGH_COMPLEX_QUERIES, %_MEDIUM_COMPLEX_QUERIES, %_LOW_COMPLEX_QUERIES).

Table 1 infra lists, for each of the three relationship patterns, the values of ACP (average number of capacity points for the pattern), FC (fraction of the characteristics associated with the pattern), FD (fraction of databases used for the pattern), and WCU (weighted value of capacity usage calculated via WCU=ACP*FC*FD).

TABLE 1

WCU For Relationship Patterns

| Relationship Pattern | ACP | FC | FD | WCU |
|---|---|---|---|---|
| Pattern_DBM_1 | 500 | .286 | .65 | 93.0 |
| Pattern_DB_BP_5 | 5200 | .286 | .80 | 1189.8 |
| Pattern_QY_MIX_12 | 7800 | .428 | .85 | 2837.6 |
| TOTAL | | | | 4120.4 |

The total value of capacity usage (4120.4) is the sum of the weighted values of capacity usage.

Figure 4:
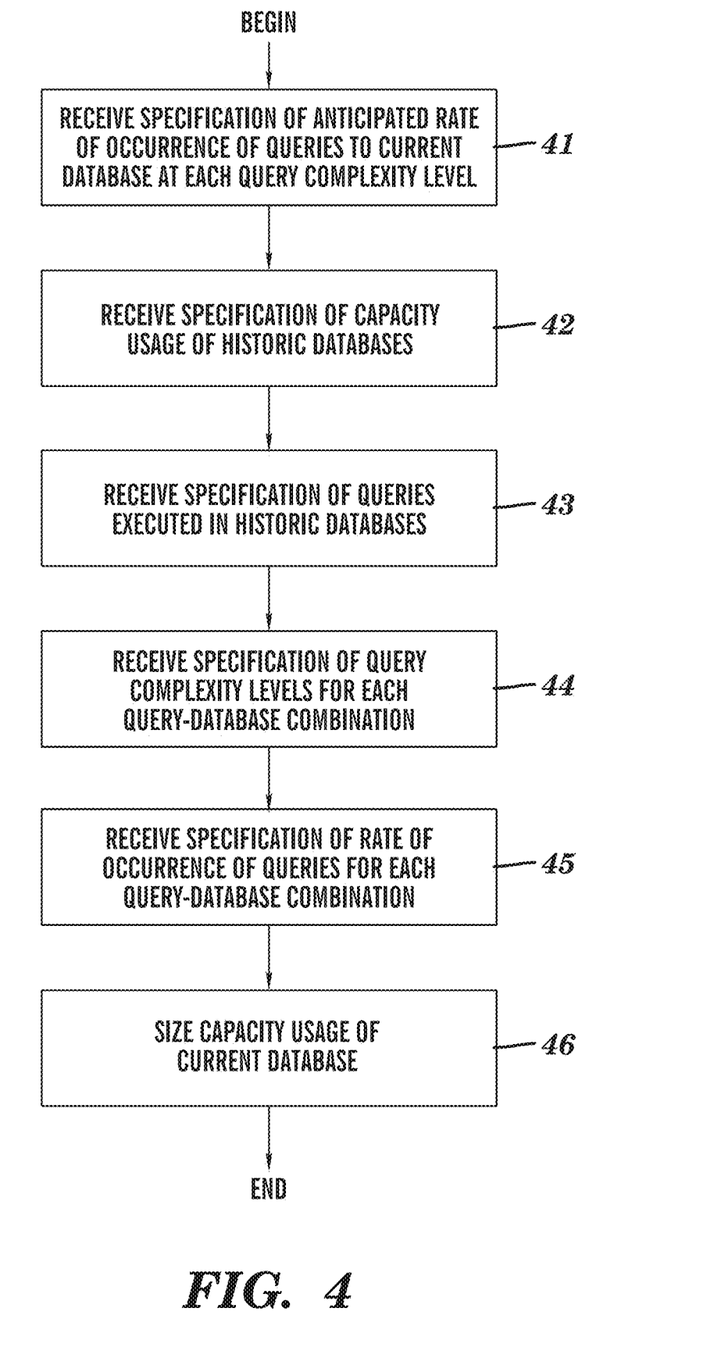
FIG. 4 is a flow chart of a method for sizing a capacity usage of a new database based on query complexity, in accordance with embodiments of the present invention.

FIG. 4 is a flow chart of a method for sizing a capacity usage of a current database based on query complexity, in accordance with embodiments of the present invention. The flow chart of FIG. 4 includes steps 41-46.

In step 41, the database sizing program 17 receives specification of an anticipated relative rate of occurrence of queries to a current database 19 at each query complexity level of a plurality of query complexity levels, wherein the relative rate of occurrence of queries to the current database corresponds to the % Use column of Tables 3 and 5 described infra. The plurality of query complexity levels may consist of two query complexity levels or may comprise three or more query complexity levels.

In step 42, the database sizing program 17 receives specification of a capacity usage of each historic database of one or more historic databases 18, wherein the capacity usage is memory usage or central processing unit (CPU) usage. In one embodiment, the one or more historic databases comprise two or more historic databases.

In step 43, the database sizing program 17 receives specification of one or more queries such that each query has been executed in at least one of the historic databases, each query independently being a specific query or a type of query.

In step 44, the database sizing program 17 receives specification of one of the query complexity levels for each query-database combination of execution of a query in a historic database. In one embodiment in which the one or more historic databases comprise two or more historic databases, at least one query of the one or more queries exists in at least two of the query-database combinations pertaining to the historic databases.

In step 45, the database sizing program 17 receives specification of a relative rate of occurrence of queries for each query-database combination pertaining to the historic databases, wherein the relative rate of occurrence of queries for each query-database combination pertaining to the historic databases corresponds to the % Use column of Tables 2 and 4 described infra.

In step 46, the database sizing program 17 sizes the capacity usage of the current database 19, based on (i) the capacity usage of each historic database; (ii) the query complexity level for each query-database combination pertaining to the historic databases; (iii) the relative rate of occurrence of queries for each query-database combination pertaining to the historic databases; and (iv) the relative rate of occurrence of queries to the current database 19 at each query complexity level.

In one embodiment, the sizing the capacity usage of the new data database comprises determining a weighted capacity usage for each query complexity level for the historic databases from which the capacity usage of the current database is sized. The determining the weighted capacity usage for each query complexity level for the historic databases may be based on (i) the capacity usage of each historic database; (ii) the query complexity level for each query-database combination pertaining to the historic databases; and (iii) the relative rate of occurrence of queries for each query-database combination pertaining to the historic databases. The sizing the capacity usage of the current database may be based on (a) the weighted capacity usage for each query complexity level for the historic databases and (b) the relative rate of occurrence of queries to the current database at each query complexity level.

In one embodiment, the determining the weighted capacity usage for each query complexity level for the historic databases comprises: for each query complexity level, computing the weighted capacity usage as a function of the capacity usage of each historic database, and the relative rate of occurrence of queries, for each query-database combination at which said each complexity level was specified.

Example 4. Sizing Capacity Usage of a Current Database Based on Query Complexity Tables 2 and 3, depicted infra, illustrate use of the method of FIG. 4 for sizing a capacity usage of a current database based on query complexity. Table 2 pertains to historical databases and Table 3 pertains to current databases whose capacity usage (memory usage and CPU usage) are being sized based on query complexity.

TABLE 2

WCU For Historic Databases (Patterns Based on EET Range and DB Size)

| DB | DB Size: (GB) | DB Query | % Use | EET | Query Comp: EET Range | Memory Usage (MB) | CPU Usage | Pattern ID | Weighted Capacity Usage (WCU) Memory | CPU |
|---|---|---|---|---|---|---|---|---|---|---|
| DB4 | 100 | DB4Q1 | 70 | .02 | Low | 256 | 82 | P_02 | 309 MB | 103 |
| DB2 | 200 | DB2Q1 | 80 | .02 | Low | 452 | 154 | | | |
| DB4 | 100 | DB4Q2 | 30 | .04 | Low | 256 | 82 | | | |
| DB1 | 500 | DB1Q1 | 50 | .09 | Med | 596 | 210 | P_06 | 272 MB | 96 |
| DB1 | 500 | DB1Q2 | 30 | .12 | Med | 596 | 210 | | | |
| DB2 | 200 | DB2Q2 | 15 | .25 | Med | 452 | 154 | | | |
| DB3 | 600 | DB3Q1 | 80 | .12 | Med | 752 | 276 | P_09 | 436 MB | 159 |
| DB3 | 600 | DB3Q2 | 20 | .14 | Med | 752 | 276 | | | |
| DB1 | 500 | DB1Q3 | 20 | .15 | Med | 596 | 210 | | | |
| DB2 | 200 | DB2Q3 | 5 | .32 | High | 452 | 154 | P_11 | 23 MB | 8 |
| DB5 | 800 | DB5Q1 | 95 | .33 | High | 2048 | 7800 | P_12 | 2048 MB | 7800 |
| DB5 | 800 | DB5Q2 | 5 | .41 | High | 2048 | 7800 | | | |

TABLE 3

WCU For Current Database (Patterns Based on EET Range and DB Size)

| Current DB (CDB) | DB Size: (GB) | DB Query | EET | Query Comp: EET Range | % Use | Pattern | Historic DB WCU Mem (MB) | CPU | Current DB WCU Mem (MB) | CPU |
|---|---|---|---|---|---|---|---|---|---|---|
| CDB1 | 230 | CDB1Qa | .08 | Low | 70 | P_02 | 309 | 103 | 285 | 97 |
| | | CDB1Qb | .15 | Med | 25 | P_06 | 272 | 96 | | |
| | | CDB1Qc | .45 | High | 5 | P_11 | 23 | 8 | | |
| CDB2 | 600 | CDB2Qa | .14 | Med | 65 | P_09 | 436 | 159 | 1000 | 2833 |
| | | CDB2Qb | .45 | High | 35 | P_12 | 2048 | 7800 | | |

The following considerations apply to all of the query complexity categories or levels. The terms "query complexity category" and "query complexity level" have the same meaning. Terms appearing in Table 2 are defined and explained as follows.

Average Elapsed Execution Time ("EET") is defined as a start to finish time taken to execute a single query and/or query type, which is an average (e.g., mean or any other average, such as a weighted average, known to one of ordinary skill in the art) of all executions of that query or query type per database. Calculating and baselining EET against historical data allows the system to identify patterns. A long running EET can identify a poorly tuned query or a highly complex query. The elapsed execution time ranges per query complexity category may be is computed using the historical benchmark data ranges collected. There could be multiple EET ranges within a single query complexity category as the patterns become more refined based on historical usage. Moreover, a given query or query type may be associated with different query complexity categories for respective different databases to reflect different execution time characteristics of different databases.

Database Size ("DB Size") of each identified database, if increased, can negatively impact the elapsed execution time for a given complex query category. The reverse is also true, since a relatively small database with a slow running query could indicate a poorly tuned query which would fall into the given complex query category. DB Size may be measured in gigabytes (GB) or any other standardized unit.

A database query (e.g., Q1, Q2, Q3, Q4, Q5 in Table 2) is a query and/or query type executed by the application for each database.

A query-database combination ("DB Query") identified, for example, as DB2Q1 means query Q1 executed in database DB2.

Percent Use ("% Use") is percent or fractional rate of executions of each application query within a given database. For example, for database DB2, the percent of executions in database DB2 of queries Q1. Q2, and Q3 are 80%, 15%, and 5%, respectively. The % Use column of Table 2 illustrates the relative rate of occurrence, of queries for each query-database combination in the historic databases, used in step 45 of FIG. 4.

Query Complexity ("Query Comp") depends on EET Range. Generally, there is a plurality of query complexity categories or levels. In an exemplary but non-limiting embodiment illustrated in Tables 2 and 3, there are three query complexity levels of Low, Medium, and High, with three associated EET ranges of less than 0.09, 0.09 to less than 0.32, and at least 0.32, respectively, in an appropriate system of units such as milliseconds, microseconds, etc.

The EET ranges may be determined, in one embodiment, as encompassing specified percentages of all queries executed in all databases being considered. For example, the EET ranges associated with the Low, Medium, and High query complexity levels may encompass 25%, 50%, and 25%, respectively, of all queries executed in all databases being considered (DB1-DB5).

Memory Usage and CPU Usage are specific to each database.

A pattern identified in the Pattern ID column of Table 2 is defined as encompassing all query-database combinations which fall within a given EET range and a given DB Size range.

The P_02 pattern is defined as encompassing queries the Low query complexity level executed in a database having a DB Size less than or equal to 240 GB.

The P_06 pattern is defined as encompassing queries the Medium query complexity level executed in a database having a DB Size less than 550 GB.

The P_09 pattern is defined as encompassing queries the Medium query complexity level executed in a database having a DB Size in a 500-700 GB range.

The P_11 pattern is defined as encompassing queries the High query complexity level executed in a database having a DB Size less than 300 GB.

The P_12 pattern is defined as encompassing queries the High query complexity level executed in a database having a DB Size greater than 500 GB.

The Weighted Capacity Usage (WCU) for each capacity usage (i.e., Memory Usage, CPU Usage) is computed, for each given pattern, as a linear or nonlinear function of the capacity usage of all of the query-database combinations associated with the given pattern, and represents an average WCU over all distinct databases utilized in the query-database combinations. Each query-database combination is weighted by % Use. In Table 2, WCU for Memory Usage and CPU Usage are each computed as a weighted summation over the Memory Usage and CPU Usage, respectively, of all of the query-database combinations associated with the given pattern, the weighting factor being % Use for each query-database combination. To obtain WCU, the summation is divided by the number of distinct databases in the query-database combinations utilized. The calculations of WCU in Table 2 are as follows.

For pattern P_02, WCU for Memory Usage: (256*0.70+452*0.80+256*0.30)/2=309 MB.

For pattern P_02, WCU for CPU Usage: (82*0.70+154*0.80+82*0.30)/2=103.

For pattern P_06, WCU for Memory Usage: (596*0.50+596*0.30+452*0.15)/2=272 MB.

For pattern P_06, WCU for CPU Usage: (210*0.50+210*0.30+154*0.15)/2=96.

For pattern P_09, WCU for Memory Usage: (752*0.80+752*0.20+596*0.20)/2=436 MB.

For pattern P_09, WCU for CPU Usage: (276*0.80+276*0.20+210*0.20)/2=159.

For pattern P_1, WCU for Memory Usage: (452*0.05)/1=23 MB.

For pattern P_11, WCU for CPU Usage: (154*0.05)/1=8.

For pattern P_12, WCU for Memory Usage: (2048*0.95+2048*0.05)/1=2048 MB.

For pattern P_12, WCU for CPU Usage: (7800*0.95+7800*0.05/1=7800

Table 3 illustrates the sizing of capacity usage (i.e., Memory Usage and CPU Usage) for two current databases identified as CDB1 and CDB2, using the WCU results for the patterns in Table 2. In Table 3, the columns of DB Size, DB Query, EET, Query Comp, and % Use have the same meaning for the current databases (CDB1, CDB2) that the corresponding columns in Table 3 have for the historical databases (DB1-DB5), except that the % Use column of Table 3 illustrates the relative rate of occurrence, of queries to the current database, used in step 41 of FIG. 4.

Table 3 shows database queries Qa, Qb, and Qc (or query types) being executed in current database CDB1 with respective query-database combinations of CDB1Qa, CDB1Qb. and CDB1Qc. Table 3 also shows database queries (or query types) Qa, and Qb being executed in current database CDB2 with respective query-database combinations of CDB2Qa and CDB2Qb.

The patterns appearing in the Pattern column of Table 3 are patterns in Table 2 whose Low, Medium, and High query complexity levels and whose defined DB Size in Table 2 encompass the corresponding query complexity levels and DB Size of the given current databases of Table 3. The Historical DB WCU values for the patterns appearing in the Pattern column of Table 3 are used to compute the Current DB WCU values for the current databases of Table 3. Accordingly, in Table 3, current database CDB1 uses the patterns P_02, P_06, and P_11 and respective DB WCU values in Table 2, and current database CDB2 uses the patterns P_09 and P_12 and respective DB WCU values in Table 2.

The Current DB WCU values, as Memory Usage and CPU Usage for the current databases CDB1 and CDB2, are computed as a linear or nonlinear function of the Historical DB WCU values weighted by the % Use values in Table 3. In Table 3, the Current DB WCU values for Memory Usage and CPU Usage are each computed as a weighted summation over the Historical DB WCU values of Memory Usage and CPU Usage, respectively, wherein the weighting factor is % Use for each database query of the current database. The calculations of the Current DB WCU values in Table 3 are as follows.

For current database CDB1, Current DB WCU for Memory Usage is computed as: 309*0.70+272*0.25+23*0.05)=285 MB.

For current database CDB1, Current DB WCU for CPU Usage is computed as: 103*0.70+96*0.25+8*0.05)=97.

For current database CDB2, Current DB WCU for Memory Usage is computed as: 436*0.65+2048*0.35=1000 MB.

For current database CDB2, Current DB WCU for CPU Usage is computed as: 159*0.65+7800*0.35=2833.

Tables 4 and 5, depicted infra, illustrate use of the method of FIG. 4 for sizing a capacity usage of a current database based on query complexity. Table 4 pertains to historical databases and Table 5 pertains to current databases whose capacity usage (memory usage and cpu usage) are being sized based on query complexity.

TABLE 4

WCU For Historical Databases (Pattern Based on EET Range, DB Size, and QRS)

| DB | DB Size: (GB) | DB Query | % Use | EET | Query Comp: EET Range | QRS % | Memory Usage (MB) | CPU Usage | Pattern ID | Weighted Capacity Usage (WCU) Memory | CPU |
|---|---|---|---|---|---|---|---|---|---|---|---|
| DB4 | 100 | DB4Q1 | 70 | .02 | Low | 5 | 256 | 82 | P_02 | 309 MB | 103 |
| DB2 | 200 | DB2Q1 | 80 | .02 | Low | 10 | 452 | 154 | | | |
| DB4 | 100 | DB4Q2 | 30 | .04 | Low | 8 | 256 | 82 | | | |
| DB1 | 500 | DB1Q1 | 50 | .09 | Med | 14 | 596 | 210 | P_06 | 272 MB | 96 |
| DB1 | 500 | DB1Q2 | 30 | .12 | Med | 8 | 596 | 210 | | | |
| DB2 | 200 | DB2Q2 | 15 | .25 | Med | 2 | 452 | 154 | | | |
| DB3 | 600 | DB3Q1 | 80 | .12 | Med | 15 | 752 | 276 | P_09 | 436 MB | 159 |
| DB3 | 600 | DB3Q2 | 20 | .14 | Med | 21 | 752 | 276 | | | |
| DB1 | 500 | DB1Q3 | 20 | .15 | Med | 25 | 596 | 210 | | | |
| DB2 | 200 | DB2Q3 | 5 | .32 | High | 2 | 452 | 154 | P_11 | 23 MB | 8 |
| DB5 | 800 | DB5Q1 | 95 | .33 | High | 42 | 2048 | 7800 | P_12 | 2048 MB | 7800 |
| DB5 | 800 | DB5Q2 | 5 | .41 | High | 45 | 2048 | 7800 | | | |

TABLE 5

WCU For Current Database (Pattern Based on EET Range, DB Size, and QRS)

| Current DB (CDB) | DB Size: (GB) | DB Query | EET | Query Comp: EET Range | QRS % | % Use | Pattern | Historic DB WCU Mem (MB) | CPU | Current DB WCU Mem (MB) | CPU |
|---|---|---|---|---|---|---|---|---|---|---|---|
| CDB1 | 230 | CDB1Qa | .08 | Low | 8 | 70 | P_02 | 309 | 103 | 285 | 97 |
| | | CDB1Qb | .15 | Med | 9 | 25 | P_06 | 272 | 96 | | |
| | | CDB1Qc | .45 | High | 3 | 5 | P_11 | 23 | 8 | | |
| CDB2 | 600 | CDB2Qa | .14 | Med | 15 | 65 | P_09 | 436 | 159 | 1000 | 2833 |
| | | CDB2Qb | .45 | High | 42 | 35 | P_12 | 2048 | 7800 | | |

Tables 4 and 5 correspond to Tables 2 and 3, respectively, with the exception that Tables 4 and 5 have an additional column of Query Result Set (QRS) which is an average percent of rows or database size returned from the database for each query-database combination. QRS may indicate more complexity and throughput if the result set is considered large relative to historical benchmark data. QRS can further tailor the query pattern identified to refine the query types and patterns applied. Specifically, in Tables 4 and 5, QRS is used as a parameter to define the patterns identified in FIGS. 4 and 5 and has no other impact on the sizing of the current databases.

A pattern identified in the Pattern ID column of Table 4 is defined as encompassing all query-database combinations which fall within a given EET range, a given DB Size range, and a given QRS range.

The P_02 pattern is defined as encompassing queries the Low query complexity level executed in a database having a DB Size less than or equal to 240 GB and QRS less than 12%.

The P_06 pattern is defined as encompassing queries the Medium query complexity level executed in a database having a DB Size less than 550 GB and QRS less than 15%.

The P_09 pattern is defined as encompassing queries the Medium query complexity level executed in a database having a DB Size in a 500-700 GB range and QRS between 15 and 25%.

The P_11 pattern is defined as encompassing queries the High query complexity level executed in a database having a DB Size less than 300 GB and QRS less than 5%.

The P_12 pattern is defined as encompassing queries the High query complexity level executed in a database having a DB Size greater than 500 GB and QRS equal to 12%.

The patterns appearing in the Pattern column of Table 5 are patterns in Table 4 whose Low, Medium, and High query complexity levels and whose defined DB Size and QRS in Table 4 encompass the corresponding query complexity levels and DB Size and QRS of the current databases (CDB1, CDB2) of Table 5.

Otherwise, all parameters and calculations described supra for Tables 2 and 3 are performed in the same manner for Tables 4 and 5, respectively.

Figure 5:
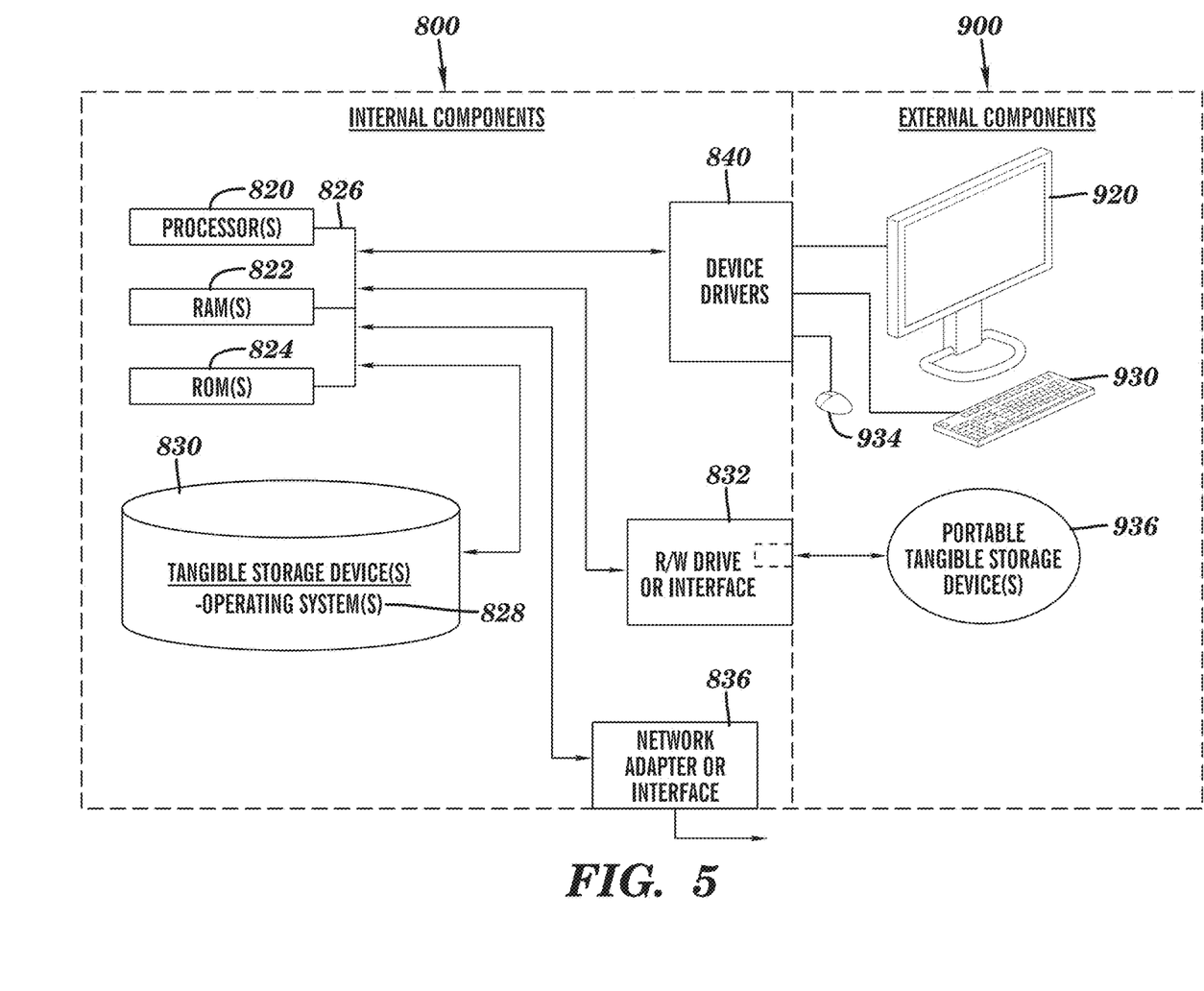
FIG. 5 illustrates a computer apparatus used by the computer system of FIG. 1 for sizing databases, in accordance with embodiments of the present invention.

FIG. 5 illustrates a computer apparatus 90 (e.g., computer 14 of FIG. 1) used by the computer system 10 of FIG. 1 for sizing databases, in accordance with embodiments of the present invention. The computer system 10 includes a set of internal components 800 and external components 900. The set of internal components 800 includes one or more processors 820, one or more computer-readable RAMs 822 and one or more computer-readable ROMs 824 on one or more buses 826, one or more operating systems 828 and one or more computer-readable storage devices 830. The one or more operating systems 828 and program instructions for programs 17 (see FIG. 1) are stored on one or more of the respective computer-readable storage devices 830 for execution by one or more of the respective processors 820 via one or more of the respective RAMs 822 (which typically include cache memory). In the illustrated embodiment, each of the computer-readable storage devices 830 is a magnetic disk storage device of an internal hard drive. Alternatively, each of the computer-readable storage devices 830 is a semiconductor storage device such as ROM 824, EPROM, flash memory or any other computer-readable storage device that can store but does not transmit a computer program and digital information.

The set of internal components 800 also includes a R/W drive or interface 832 to read from and write to one or more portable computer-readable storage devices 936 that can store but do not transmit a computer program, such as a CD-ROM, DVD, memory stick, magnetic tape, magnetic disk, optical disk or semiconductor storage device. The program instructions for programs 17-19 can be stored on one or more of the respective portable computer-readable storage devices 936, read via the respective R/W drive or interface 832 and loaded into the respective hard drive or semiconductor storage device 830. The term "computer-readable storage device" does not mean signal propagation media such as copper transmission cables, optical transmission fibers and wireless transmission media.

The set of internal components 800 also includes a network adapter or interface 836 such as a TCP/IP adapter card or wireless communication adapter (such as a 4G wireless communication adapter using OFDMA technology). The programs instructions for programs 17-19 can be downloaded to the respective computing/processing devices from an external computer or external storage device via a network (for example, the Internet, a local area network or other, wide area network or wireless network) and network adapter or interface 836. From the network adapter or interface 836, the programs are loaded into the respective hard drive or semiconductor storage device 830. The network may comprise copper wires, optical fibers, wireless transmission, routers, firewalls, switches, gateway computers and/or edge servers.

The set of external components 900 includes a display screen (i.e., touch screen) 920, a keyboard or keypad 930, and a computer mouse or touchpad 940. The sets of internal components 800 also includes device drivers 840 to interface to display screen 920 for imaging, to keyboard or keypad 930, to computer mouse or touchpad 940, and/or to display screen for pressure sensing of alphanumeric character entry and user selections. The device drivers 840, R/W drive or interface 832 and network adapter or interface 836 comprise hardware and software (stored in storage device 830 and/or ROM 824).

The programs can be written in various programming languages (such as Java, C+) including low-level, high-level, object-oriented or non object-oriented languages. Alternatively, the functions of the programs can be implemented in whole or in part by computer circuits and other hardware (not shown).

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for sizing databases, the method comprising:
identifying, by one or more processors, multiple patterns of historical capacity usage by multiple databases in a computer system, wherein the multiple patterns are statistically significant for multiple characteristics due to the multiple databases including an input value of each characteristic of multiple characteristics pertaining to utilization of the multiple databases, and wherein the capacity usage is memory usage or central processing unit (CPU) usage;
computing, for each pattern, by the one or more processors, a weighted value of capacity usage (WCU) according to WCU=ACP*FC*PC, wherein ACP=an average value of historical capacity points for each pattern, wherein FC=fraction of the characteristics associated with each pattern, and wherein PC=a fraction of the multiple databases used for each pattern;
computing, by the one or more processors, a total value of capacity usage as a sum of the weighted values of capacity usage;
sizing, by the one or more processors, one or more current databases via utilization of the computed total value of capacity usage; and
creating, by the one or more processors, a virtual machine or a new server of the computer system, wherein the virtual machine or new server comprises the sized one or more current databases.

2. The method of claim 1, wherein the one or more current databases that are sized are a plurality of current databases that are sized, the method further comprising:
determining, by the one or more processors, that an actual capacity usage by the plurality of current databases over a period of time after the plurality of current databases were sized is not within a predetermined percentage of the computed total value of capacity usage, and in response, identifying at least one characteristic of the multiple characteristics for which an attempt to identify a statistically significant pattern was unsuccessful;
deleting, by the one or more processors, the identified at least one characteristic from the multiple characteristics; and
resizing, by the one or more processors, the plurality of current databases based on the at least one characteristic having been deleted from the multiple characteristics.

3. The method of claim 1, wherein the multiple characteristics comprise complexity of database queries which include multiple joins.

4. The method of claim 1, wherein each pattern is statistically significant for either only a single characteristic of the multiple characteristics or for two or more characteristics of the multiple characteristics, and wherein each pattern encompasses the input value of each characteristic for which each pattern is statistically significant.

5. The method of claim 4, wherein the multiple patterns comprise a pattern that is statistically significant for only a single characteristic of the multiple characteristics.

6. The method of claim 4, wherein the multiple patterns comprise a pattern that is statistically significant for two or more characteristics of the multiple characteristics.

7. A computer program product, comprising one or more computer readable hardware storage devices having computer readable program code stored therein, said program code containing instructions executable by one or more processors of a computer system to implement a method for sizing databases, said method comprising:
receiving, by the one or more processors, an input value of each characteristic of multiple characteristics pertaining to utilization of multiple databases in a computer system;
identifying, by the one or more processors, multiple patterns of historical capacity usage by the multiple databases, wherein the multiple patterns are statistically significant for the multiple characteristics due to the multiple databases including the input values, and wherein the capacity usage is memory usage or central processing unit (CPU) usage;

computing, for each pattern, by the one or more processors, a weighted value of capacity usage (WCU) according to WCU=ACP*FC*PC, wherein ACP=an average value of historical capacity points for each pattern, wherein FC=fraction of the characteristics associated with each pattern, and wherein PC=a fraction of the multiple databases used for each pattern;

computing, by the one or more processors, a total value of capacity usage as a sum of the weighted values of capacity usage;

sizing, by the one or more processors, one or more current databases via utilization of the computed total value of capacity usage; and creating, by the one or more processors, a virtual machine or a new server of the computer system, wherein the virtual machine or new server comprises the sized one or more current databases.

8. The computer program product of claim 7, wherein the one or more current databases that are sized are a plurality of current databases that are sized, the method further comprising:

determining, by the one or more processors, that an actual capacity usage by the plurality of current databases over a period of time after the plurality of current databases were sized is not within a predetermined percentage of the computed total value of capacity usage, and in response, identifying at least one characteristic of the multiple characteristics for which an attempt to identify a statistically significant pattern was unsuccessful;

deleting, by the one or more processors, the identified at least one characteristic from the multiple characteristics; and resizing, by the one or more processors, the plurality of current databases based on the at least one characteristic having been deleted from the multiple characteristics.

9. The computer program product of claim 7, wherein the multiple characteristics comprise complexity of database queries which include multiple joins.

10. The computer program product of claim 7, wherein each pattern is statistically significant for either only a single characteristic of the multiple characteristics or for two or more characteristics of the multiple characteristics, and wherein each pattern encompasses the input value of each characteristic for which each pattern is statistically significant.

11. The computer program product of claim 10, wherein the multiple patterns comprise a pattern that is statistically significant for only a single characteristic of the multiple characteristics.

12. The computer program product of claim 10, wherein the multiple patterns comprise a pattern that is statistically significant for two or more characteristics of the multiple characteristics.

13. A computer system, comprising one or more processors, one or more memories, and one or more computer readable hardware storage devices, said one or more hardware storage device containing program code executable by the one or more processors via the one or more memories to implement a method for sizing databases, said method comprising:

receiving, by the one or more processors, an input value of each characteristic of multiple characteristics pertaining to utilization of multiple databases in a computer system;

identifying, by the one or more processors, multiple patterns of historical capacity usage by the multiple databases, wherein the multiple patterns are statistically significant for the multiple characteristics due to the multiple databases including the input values, and wherein the capacity usage is memory usage or central processing unit (CPU) usage;

computing, for each pattern, by the one or more processors, a weighted value of capacity usage (WCU) according to WCU=ACP*FC*PC, wherein ACP=an average value of historical capacity points for each pattern, wherein FC=fraction of the characteristics associated with each pattern, and wherein PC=a fraction of the multiple databases used for each pattern;

computing, by the one or more processors, a total value of capacity usage as a sum of the weighted values of capacity usage;

sizing, by the one or more processors, one or more current databases via utilization of the computed total value of capacity usage; and creating, by the one or more processors, a virtual machine or a new server of the computer system, wherein the virtual machine or new server comprises the sized one or more current databases.

14. The computer system of claim 13, wherein the one or more current databases that are sized are a plurality of current databases that are sized, the method further comprising:

determining, by the one or more processors, that an actual capacity usage by the plurality of current databases over a period of time after the plurality of current databases were sized is not within a predetermined percentage of the computed total value of capacity usage, and in response, identifying at least one characteristic of the multiple characteristics for which an attempt to identify a statistically significant pattern was unsuccessful;

deleting, by the one or more processors, the identified at least one characteristic from the multiple characteristics; and resizing, by the one or more processors, the plurality of current databases based on the at least one characteristic having been deleted from the multiple characteristics.

15. The computer system of claim 13, wherein the multiple characteristics comprise complexity of database queries which include multiple joins.

16. The computer system of claim 13, wherein each pattern is statistically significant for either only a single characteristic of the multiple characteristics or for two or more characteristics of the multiple characteristics, and wherein each pattern encompasses the input value of each characteristic for which each pattern is statistically significant.

17. The computer system of claim 16, wherein the multiple patterns comprise a pattern that is statistically significant for only a single characteristic of the multiple characteristics.

18. The computer system of claim 16, wherein the multiple patterns comprise a pattern that is statistically significant for two or more characteristics of the multiple characteristics.

* * * * *